Aug. 24, 1965  A. W. BATEMAN  3,202,875
PROTECTIVE RELAY SYSTEM
Filed June 23, 1960

Inventor:
Amos W. Bateman
by Irving H. Marshman
Attorney.

United States Patent Office 3,202,875
Patented Aug. 24, 1965

3,202,875
PROTECTIVE RELAY SYSTEM
Amos W. Bateman, Bryn Mawr, Pa., assignor to General Electric Company, a corporation of New York
Filed June 23, 1960, Ser. No. 38,257
6 Claims. (Cl. 317—18)

This invention relates to protective electric relay systems, and more particularly to relay systems for protecting grounded neutral polyphase systems against ground faults occurring within a protected zone while preventing relay operation on faults occurring outside the protected zone, and it has for an object the provision of a simple, reliable, efficient and improved system of this character.

Heretofore, protective systems of this character have employed a current transformer in the grounded neutral connection and an individual current transformer in each outgoing phase conductor together with a percentage differential relay connection to be energized by the line and neutral current transformers. The sensitivity of such a differential relay system is approximately inversely proportional to the ratios of the current transformers employed, and since the line current transformers must be able to carry full load current continuously, the sensitivity of the system is undesirably limited. Accordingly, a further object of this invention is the provision of a differential protective system for grounded neutral polyphase systems that has a very substantially higher sensitivity than prior conventional systems employing percentage differential relays and individual current transformers in each outgoing phase conductor.

By way of a brief description of the invention, two cooperatnig main operating coils of a product type directional relay are connected in series relationship with each other. A current transformer in the ground to neutral connection of the protected polyphase system is connected to supply current to the two relay coils in series, and a window type current transformer located at the boundary of the protected zone and surrounding all of the phase conductors through which currents enter or leave the system is connected to the relay coils so as to supply current to one of them in the same direction as the current supplied from the neutral transformer and to supply current to the other in the opposite direction with respect to the current supplied from the neutral transformer. The turns ratio of the window type current transformer is substantially lower than that of the neutral transformer.

Figure 1:
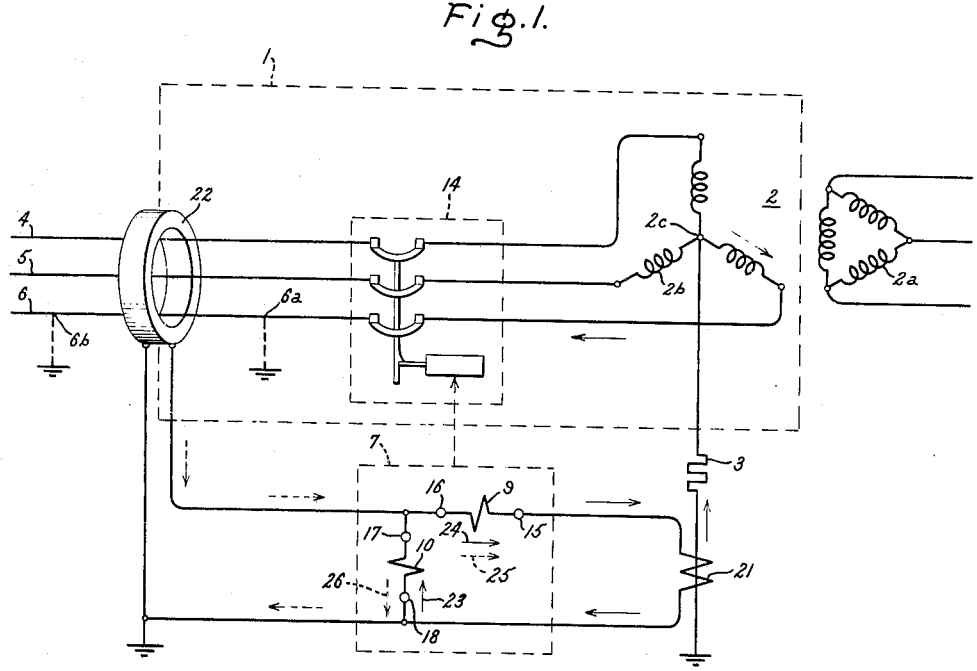
Figure 2:
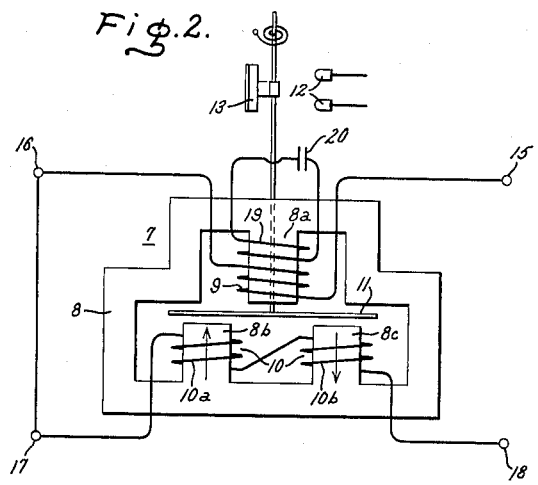

For a better and more complete understanding of the invention reference should now be had to the following specification and to the accompanying drawings of which FIG. 1 is a simple diagrammatic sketch of an embodiment of the invention and FIG. 2 is a simple diagrammatic sketch of one form of a product type directional relay that may usefully be employed in the embodiment of the invention illustrated in FIG. 1.

Referring now to the drawing and particularly to FIG. 1, a polyphase grounded neutral system containing polyphase power apparatus has a zone 1 that is to be protected by means of a differential relay against internal ground faults while preventing operation of the relay by faults occurring outside the protected zone. Note that zone 1 includes the primary circuit conductors 4, 5 and 6 from current transformer 22 to point 2c of power transformer 2. The apparatus within the protected zone is illustrated as comprising a power transformer 2, but it could be any other apparatus such as a polyphase generator or polyphase motor or other translating device. The transformer 2 is illustrated as having a delta connected primary winding 2a and a Y connected secondary winding 2b with its neutral 2c connected to ground through a neutral resistor 3. Alternating currents enter and leave the system through phase conductors 4, 5 and 6.

For the purpose of protecting the system against internal ground faults, i.e., ground faults occurring within the protected zone 1, in a single two coil product type directional relay 7 is provided. This relay is illustrated as comprising a closed magnetic structure 8 having an upper pole piece 8a upon which is wound one of its coils 9 and two lower pole pieces 8b and 8c upon which are wound separate halves 10a and 10b of the other coil; the two halves thus constituting the lower coil 10 of the relay. Mounted for rotation in the air gap between the upper and lower pole pieces is an eddy current disc 11 that is fabricated from a suitable material such as copper or aluminum. A stationary contact 12 is mounted on the relay frame (not shown) in the path of movement of a movable contact 13 that is suitably mounted for rotation with the disc 11. For example, it may be mounted on the shaft on which the eddy curent disc is mounted. A tripping circuit for a power circuit breaker 14 is completed when the movable contact engages the stationary contact.

The coil 9 has terminals 15 and 16 and coil 10 has terminals 17 and 18. When the coils 9 and 10 are energized so that currents flow simultaneously from the higher numbered terminal to the lower numbered terminal in both coils, or from the lower numbered terminal to the higher numbered terminal in both coils, they coact with each other and with the disc 11 to develop a torque that causes the disc to rotate in the contact closing or tripping direction. If the polarity relationship of the coils is changed, that is to say, if the direction of current flow in either coil is reversed and remains unchanged in the other coil, the coils coact with the disc to produce a reverse torque, i.e., in the contact opening direction. In other words, if currents simultaneously flow from the higher numbered terminal to the lower numbered terminal in one coil and from the lower numbered terminal to the higher numbered terminal in the other coil the relay develops a torque in the contact opening direction.

An auxiliary coil 19 is wound on the upper pole piece and is connected to a capacitor 20. These elements coact to produce the phase displacement between the fluxes of the upper and lower poles pieces that is essential to the development of a torque for effecting rotation of disc 11. The torque is maximum when the phase displacement of these fluxes is 90°.

A current transformer 21 having a wound primary winding is connected in the neutral to ground connection of the system. The two coils 9 and 10 of the product relay 7 are connected in series relationship to each other across the secondary winding of this current transformer and are connected in such polarity that current supplied by this secondary winding flows from the higher numbered terminal to the lower numbered terminal simultaneously in both coils. Thus the current supplied to the relay coils by the neutral current transformer causes the relay to develop a torque in the contact closing direction. Owing to the connection of transformer 21 in the neutral to ground connection it supplies current to the coils 9 and 10 in response both to internal and external ground faults.

For the purpose of preventing contact closing operation by the relay on an external ground fault, a single window type transformer 22 is located at the boundary of the protected zone and is mounted so that it surrounds all of the phase conductors 4, 5 and 6 through which currents enter and leave the system. This transformer is connected to the relay coils 9 and 10 so that any current that it supplies to them will flow from the higher numbered terminal to the lower numbered terminal in one of the coils and simultaneously from the lower numbered terminal to the higher numbered terminal in the other coil. As shown in FIG. 1 the secondary winding of transformer 22 is connected across the relay coil 10.

However, connecting it across coil 9 would be equally appropriate. Thus the currents that current transformer 22 supplies to the relay coils are in the contact opening direction and consequently act to prevent the relay from closing its contacts.

With no external ground fault on the system, the currents entering the system at the boundary of the protected zone via conductors 4, 5 and 6 are equal to the currents leaving the system. Consequently, the vector sum of the fluxes around the phase conductors at the boundary where they pass through the window of transformer 22 is zero, and the transformer will supply zero current to the relay coils 9 and 10. However, if there is an external ground fault on the system, the vector sum of the currents in the phase conductors at this point will not be zero and the transformer will supply currents to the relay coils.

Generally the accuracy of a wound primary type transformed is substantially greater than that of a window type current transformer. In order that any inaccuracy of transformer 22 shall not result in net currents flowing in both relay coils 9 and 10 in the closing direction when both transformers are supplying currents to these coils in response to an external ground fault, the turns ratio of transformer 22 is made substantially lower than the turns ratio of the neutral transformer 21. For example, the window transformer 22 may appropriately have a ratio of 20:1 and the neutral transformer may appropriately have a ratio of 30:1. Thus on an external ground fault net current in coil 10 from lower numbered terminal to the higher numbered terminal is assured at the instant when current in coil 9 is from higher numbered terminal to lower numbered terminal. This results in torque in the contact opening direction.

With the foregoing explanation of the elements in their organization, the operation of the system both on internal and external ground faults will readily be understood.

On an internal ground fault, for example, a ground fault on the phase conductor 6 at point 6a, current will flow from the phase conductor 6 into the ground fault and thence from ground to the grounded neutral of the power transformer and then back to conductor 6. As a result, current will flow from the lower terminal of neutral transformer 21 through coils 10 and 9 in series from the higher numbered terminal to the lower numbered terminal in both coils as indicated by solid line arrows 23 and 24. Since the fault is internal, no fault current will pass through the current transformer 22 at the boundary of the protected zone, and the vector sum of the currents in the phase conductors at the boundary at which they pass through the window transformer 22 will therefore be zero. Thus the transformer 22 will furnish no currents to the relay coils 9 and 10. Consequently, the relay will close its contacts and trip the circuit breaker in response to current supplied by the neutral transformer flowing simultaneously in both coils from the higher numbered terminal to the lower numbered terminal.

In the event of an external ground fault on the system, e.g., a ground on the conductor 6 at point 6b, current from conductor 6 will flow into the fault and out of the ground to the grounded neutral of the system as before and thence to conductor 6. As a result, the neutral transformer 21 will supply current to the relay coils 9 and 10 from the higher numbered terminals to the lower numbered terminals as indicated by the solid line arrows 23 and 24 as in the case of the internal fault. However, this fault current from the ground fault at 6b to the grounded neutral definitely passes through the window current transformer. The vector sum of the currents in the phase conductors at the boundary where they pass through the window of the transformer is no longer zero. Consequently, transformer 22 supplies current to the coil 10 in the direction indicated by the arrow 26. The window transformer current that is supplied to coil 10 flows from the lower numbered terminal to the higher numbered terminal and thus opposes the current supplied to this coil from the neutral transformer. If the transformers 21 and 22 had equal ratios and equal accuracies, the opposing currents supplied by both transformers in coil 10 would be precisely equal, the net current would be zero and the relay would develop zero torque in the tripping direction; thus the relay would not close its contacts. Since window type current transformers have lower accuracies than wound primary current transformers the possibility exists that on an external ground fault the transformer 22 would supply less current to coil 10 than is supplied thereto by transformer 21. This may result in a net current in coil 10 flowing from the higher numbered terminal to the lower numbered terminal. Thus current would flow in both coils from the higher numbered terminal to the lower numbered terminal. This would result in false operation of the relay on an external fault. However, owing to the substantially lower ratio of transformer 22 the current that it supplies to coil 10 is substantially larger than the current supplied thereto by a neutral transformer 21. As a result, the net current in coil 10 is in the direction from the lower numbered terminal to the higher numbered terminal.

Thus with net current from the higher numbered terminal to the lower numbered terminal in one coil and from the lower numbered terminal to the higher numbered terminal in the other coil, the relay develops torque in the contact opening direction and an external ground fault is thereby prevented from effecting operation of relay 7 in the tripping direction.

The operation described above is that of a power system having no grounded neutrals other than in the protected zone such as the protected zone 1 in FIG. 1. For power systems which have other grounded neutrals outside the protected zone, the protective relay will have additional current causing relay contact closure for faults in the protected zone. For faults outside the protected zone, the currents in the relay coils will be generally the same as for the case of external faults in the above description in connection with FIG. 1. For the case of a fault in the protected zone, such as at location 6a in FIG. 1 the current supplied by current transformer 22 will have a direction opposite to that represented by the dotted arrows. Consequently, it flows in coil 10 in the same direction as the current supplied by current tansformer 21 thereby causing increased relay torque in the contact closing direction. For the case of the fault outside the protected zone, e.g. at location 6b, the fault current at 6b, owing to one or more grounded neutrals other than that shown in FIG. 1 follows a path completely external to this relay system and thus has no effect on it.

For the case of the fault in the protected zone, location 6a in FIG. 1, the current out of CT22 will be in the opposite direction to that shown by the dotted arrows. Thus it flows in coil 10 in the same direction as the current from CT21 causing increased relay torque in the contact closing direction. For the case of the fault outside the protected zone, location 6b in FIG. 1, the fault current at 6b due to neutral grounds other than that shown in FIG. 1 follows a path completely external to this relay system and thus has no effect on said relay system.

Although this invention has been dscribed as embodied in specific apparatus and its principle has been described together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In a protective system for a grounded neutral polyphase system having a plurality of phase conductors through which currents enter and leave the system, a first current transformer connected in the neutral to ground connection of said system, said first current transformer having a secondary winding, a product type directional relay having first and second cooperating coils connected in series relationship with each other across the secondary winding of said first current transformer for operation of said relay in a predetermined direction in response to an internal ground fault, and a window type current transformer having a lower turns ratio than said first transformer surrounding all said phase conductors, said window type current transformer having a secondary winding connected across one of said coils to effect energization of said coils in response to an external ground fault in directions to prevent operation of said relay in said predetermined direction.

2. In a protective system for a polyphase neutral system having a plurality of phase conductors through which currents enter and leave the system, a first current tansformer connected in the neutral to ground connection of said system, said first current transformer having a secondary winding, a product type directional relay having a first coil and a second coil connected in series relationship with each other across the secondary winding of said first current transformer for energization of said coils in predetermined relative directions to effect operation of said relay in a predetermined direction in response to an internal ground fault, and a window type current transformer having a lower turns ratio than said first transformer surrounding all said phase conductors, said window type current transformer having a secondary winding connected across one of said coils to effect energizations of said coils in relative directions opposite to said predetermined relative directions in response to an external ground fault thereby to prevent an external ground fault from effecting operation of said relay in said predetermined direction.

3. In a protective arrangement for a grounded neutral polyphase system having a plurality of phase conductors through which current enter and leave the system, a product type directional relay having a pair of cooperating coils connected in series relationship and operable in a predetermined direction in response to energization of said coils in predetermined relative directions and prevented from operation in said predetermined direction in response to energization of said coils in opposite relative directions, a first current transformer connected in the neutral to ground connection of said system and having a secondary winding across which the series combination of said coils is connected for energizing said coils in said predetermined relative directons in response to an internal fault thereby to effect operation of said relay in said predetermined direction, and a window type current tansformer having a lower turns ratio than said first transformer surrounding said phase conductors, said window type current transformer having a secondary winding connected across one of said coils for effecting energization of said coils in said opposite relative directions in response to an external ground fault thereby to prevent an external ground fault from effecting operation of said relay in said predetermined direction.

4. In a protective system for a groundea neutral polyphase system having a plurality of phase conductors through which currents enter and leave said system, a first current transformer connected in the neutral to ground connection of said system, said first current transformer having a secondary winding, a directional relay having cooperating first and second coils connected in series relationship with each other across the secondary winding of said first current transformer for energization of said coils in predetermined relative polarities to effect operation of said relay in a predetermined direction in response to a ground fault, a window type current transformer having a lower turns ratio than said first transformer surrounding all said phase conductors, said window type current transformer having a secondary winding connected to said coils for supplying, in response to an external fault, a current to one of said coils aiding the current received from said first transformer and a current to the other of said coils opposing and exceeding the current received from said first transformer thereby to prevent an external ground fault from effecting operation of said relay in said first predetermined direction.

5. In a protective arrangement for a grounded neutral polyphase system having a plurality of phase conductors through which currents enter and leave said system, a product type directional relay having a pair of cooperating coils connected in series relationship and operable in a predetermined direction in response to energization of said coils in predetermined relative polarities and inactivated for operation in said predetermined direction in response to energization of said coils in reverse relative polarities, a current transformer connected in the neutral to ground connection of said system and having a secondary winding connected to said coils for energizing said coils in said predetermined relative polarities in response to an internal ground fault, a window type current tansformer having a lower turns ratio than said neutral transformer surrounding all phase conductors, said window type current transformer having a secondary winding connected to said coils to supply currents to said coils to effect said reverse polarity energization thereof and thereby prevent an external ground fault from effecting operation of said relay in said first direction, said window transformer producing zero current in response to vector sum zero of the currents in said phase conductors thereby permitting operation of said relay in said first direction by the currents supplied to said coils by said neutral transformer in response to an internal ground fault.

6. In a protective system for a grounded neutral polyphase system having a plurality of phase conductors through which currents enter and leave said system, a first current tansformer connected in the neutral to ground connectio of said system, said first current transformer having a secondary winding, a directional relay having a first coil and a second coil connected in series relationship with each other across the secondary winding of said first current transformer for energization in a direction tending to effect operation in a predetermined direction in response to a ground fault, a window type current transformer having a lower turns ratio than said first transformer surrounding all said phase conductors, said window type current transformer having a secondary winding connected to said coils for supplying to said coils, in response to an external fault, a current opposing and exceeding the current supplied thereto by said first transformer thereby to prevent an external fault from effecting operation of said relay in said predetermined direction, said window transformer supplying zero current in response to zero vector sum of the currents in said phase conductors thereby presenting non-interference to the operation of said relay in said predetermined direction in response to an internal fault.

References Cited by the Examiner

UNITED STATES PATENTS

| | | | |
|---|---|---|---|
| 1,731,971 | 10/29 | Courtin | 317—18 |
| 2,098,035 | 11/37 | Fukushima | 317—18 |
| 2,238,570 | 4/41 | Schweitzer | 317—14.9 |
| 2,381,281 | 8/45 | Harder | 317—18 |

FOREIGN PATENTS 624,091  1/36  Germany.

SAMUEL BERNSTEIN, *Primary Examiner.*